US006454487B1

(12) United States Patent
Buenning et al.

(10) Patent No.: US 6,454,487 B1
(45) Date of Patent: Sep. 24, 2002

(54) DEVICE FOR SECURING ELEMENTS TO A WIRE GRID

(75) Inventors: Torsten Buenning; Johannes Koban, both of Stuttgart; Michael Koeck, Moegglingen; Armin Breitenbuecher, Pluederhausen, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/647,192

(22) PCT Filed: Feb. 6, 1999

(86) PCT No.: PCT/DE99/00315

§ 371 (c)(1), (2), (4) Date: Sep. 27, 2000

(87) PCT Pub. No.: WO99/50564

PCT Pub. Date: Oct. 7, 1999

(30) Foreign Application Priority Data

Mar. 27, 1998 (DE) ........................................ 198 13 568

(51) Int. Cl.[7] .................................................. F16B 2/02
(52) U.S. Cl. ........................ 403/400; 403/389; 403/391
(58) Field of Search ................................ 403/384, 400, 403/396, 391

(56) References Cited

U.S. PATENT DOCUMENTS 3,765,634 A * 10/1973 Stempel
4,066,373 A * 1/1978 Workman
4,217,711 A * 8/1980 Spresser et al.
4,765,077 A * 8/1988 Rosenthal et al.
4,773,175 A * 9/1988 Larsen
4,777,750 A * 10/1988 Garfinkle
5,235,767 A * 8/1993 Waterman et al.
5,331,756 A * 7/1994 Rehrig
5,492,295 A 2/1996 Remmers
5,758,439 A * 6/1998 Sawyer et al.
5,794,953 A * 8/1998 Duchene et al.
5,901,482 A * 5/1999 Sawyer et al.

FOREIGN PATENT DOCUMENTS

DE 2231432 A * 11/1990
DE 297 11 673 U 9/1997
DE 29711673 * 10/1997
FR 2 538 868 A 7/1984
GB 2 231 432 A 11/1990

* cited by examiner

*Primary Examiner*—Lynne H. Browne
*Assistant Examiner*—Ernesto Garcia
(74) *Attorney, Agent, or Firm*—Michael J. Striker

(57) ABSTRACT

A device for fastening elements to at least one first grating composed of wires, the device has at two essentially flat elements which are connectable to each other and clampable around the wires of the at least first grating, the elements having at least one side with side edges and ribs provided along the side edges of the at least one side of the elements and leaving corner regions of the side edges open, the ribs having sides, the sides of the ribs and the sides of the elements being placeable at least partially against the wires of the at least first grating, the at least one side of the at least one having a first raised area with a surface area that is smaller than a surface area of the at least one element, the first raised area being provided with a second raised area with a surface area that is smaller than the surface area of the first raised area, the second raised area having sides, the sides of the second raised area and the surface area of the first raised area being arranged to rest at least partially against the wires of a second grating.

8 Claims, 1 Drawing Sheet

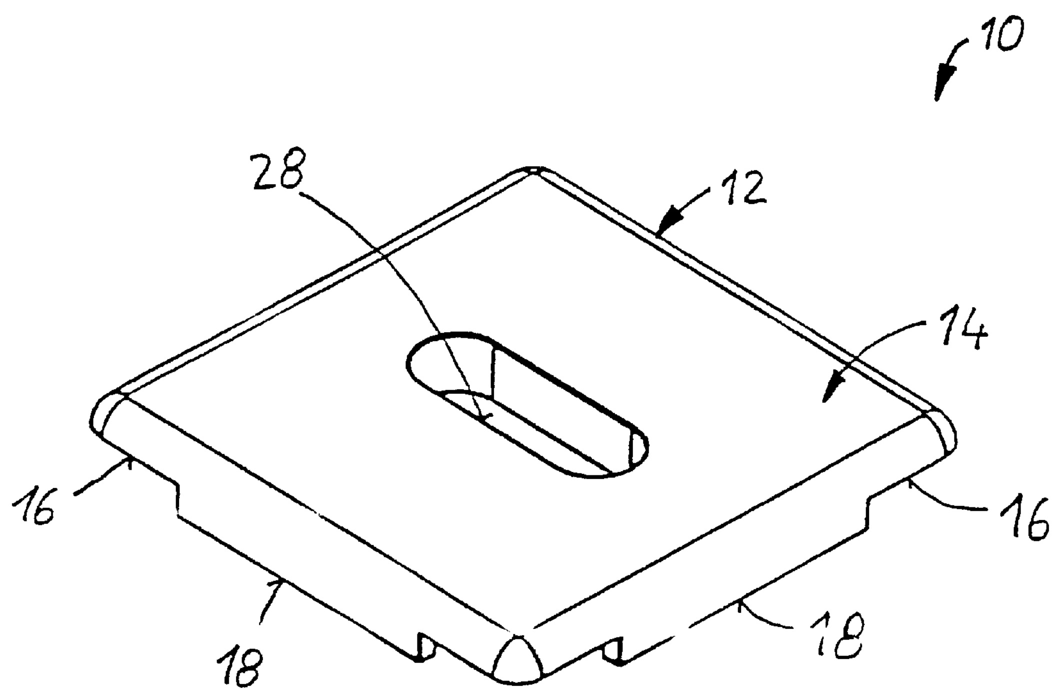
10
28
12
14
16
16
18
18
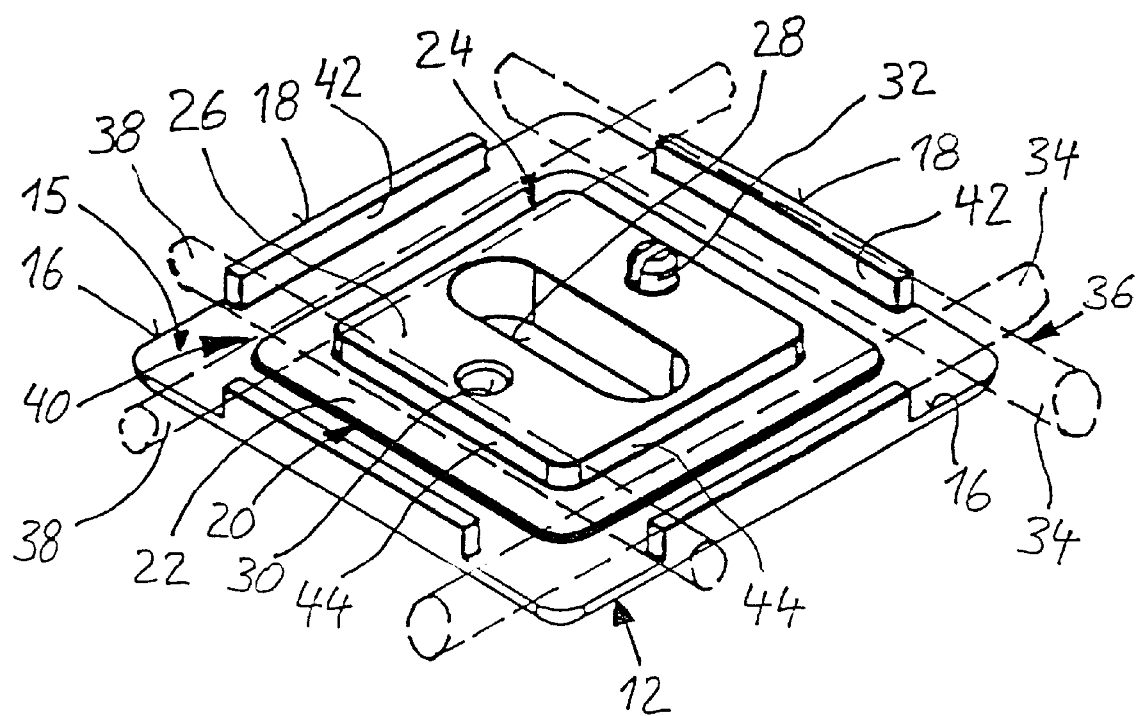
24
28
38
26
18
42
32
18
34
15
42
16
34
36
40
38
22
20
30
44
44
16
34
12

DEVICE FOR SECURING ELEMENTS TO A WIRE GRID

BACKGROUND OF THE INVENTION

The invention is based on a device for fastening elements to a grating comprised of wires. Usually, binding wires, sheet metal strips that can be suspended and crimped, or sheet metal elements that can be riveted are used to fasten elements, such as signs, information panels, handles, or the like, to a grating comprised of wires. These parts have the disadvantage that they must be cut to length for each use and are sometimes expensive to mount.

SUMMARY

It is therefore an object of present invention to provide a device for fastening elements to a grating comprised of wires which avoids the disadvantages of the prior art.

In keeping with these objects, one feature of present invention resides, briefly stated, in the device of this type in which two essentially flat elements are provided that are connectable to each other and used to clamp around the wires of the grating.

The device according to the invention for fastening elements to grating comprised of wires, has the advantage over the prior art that it is simple to mount. It is particularly advantageous to provide at least one of the elements with projections which encompass in a form-fitting manner with the grating since the device is thus adjusted in its position. In this connection, it is particularly advantageous to provide the device with projections so that the device can be fastened to different gratings.

BRIEF DESCRIPTION OF THE DRAWING

An exemplary embodiment of the invention is shown in the drawing and will be explained in detail below. The sole FIGURE shows a device and two symbolically depicted different gratings in a perspective, exploded view.

DESCRIPTION OF THE PREFERRED EMBODIMENTS

The FIGURE shows a device 10 which is comprised of two essentially flat elements 12 which can be connected to each other and which have a square surface area. The one side of the elements 12, which is labeled 14 in the FIGURE, is embodied as flat and has rounded edges. On the other side, which is referred to below has the mounting side 15, projections in the form of ribs 18 are embodied along the side edges 16 and leave the corner regions of the side edges 16 open. A square raised area 20 is formed onto the center of the mounting side 15 and has a surface area 22 that is smaller than the mounting side 15. A second raised area 24 is formed onto the first raised area 20 and has a surface area 26 that is smaller than the surface area 22 of the first raised area 20. The edge length of the raised area 24 advantageously corresponds to the length of the ribs 18. In the center of the elements 12, recesses are provided through which fastening means, not shown, can be inserted and which have the form of an oblong hole 28. Next to the one long side of an oblong hole 28 a recess in the form of a bore 30 is embodied in the second raised area 24. Next to the other side of the oblong hole 28, a split pin 32 is provided on the second raised area 24. The bore 30 and the pin 32 are embodied so that when the elements 12 are assembled, a press fit is produced.

Two first wires 34 of a mesh of a first grating 36 are symbolically depicted in the right region of an element 12 in the FIGURE and two second wires 38 of a mesh of a second grating 40 are symbolically depicted in the left region of the element 12. The wires 34, 38 can be embodied as straight rods or in a wavy shape of the type that is known in woven wire gratings. The wires 34 are embodied as thicker than the wires 38 and are arranged in such a way that a larger mesh widths is produced than with the wires 38. The opposing sides 42 of the ribs 18 are spaced so that they rest against the wires 38 of the grating 36. The height of the ribs 18 is dimensioned so that the regions of the mounting side 15 adjoining them likewise rest against the wires 34 of the grating 16 when the elements 12 are assembled. The height of the sides 44 of the second raised area 24 is dimensioned so that when the elements 12 are mounted onto a grating, the wires 38 of the second grating 40 rest against the sides 44 of the second raised area 24 and against the surface area 22 of the first raised area 20 encompassing the sides 44. Due to this advantageous embodiment of the ribs 18 and the raised areas 20, 24, both the grating 36 and the grating 40 can be encompassed by the device 10 in a form-fitting manner, as a result of which the device 10 can be affixed to different gratings 36, 40. Moreover, both the height of the ribs 18 and the heights of the raised areas 20, 24 are dimensioned so that they do not at first touch when the elements 12 are mounted to a grating 36, 40; i.e. they are less than half the thickness of a grating 36 or 40.

In order to mount the device 10, a first element 12 is initially held against a grating 36, 40 so that it encompasses a mesh of the grating 36, 40 in a form-fitting manner. Then, another element 12 is guided against the grating 36, 40 from the other side. Finally, the two elements 12 are pressed together. Through the embodiment of the opposing bores 30 and pins 32, the two elements 12 can be pressed together by light finger pressure in order to clamp around the wires (34, 38) of the grating (36, 40). Finally, another element that is not shown, for example a sign, an information panel, or a door handle, can be fasten with a screw and a nut to the device 10 and consequently to the grating 36 or 40. By means of the above-described dimensioning of the heights of the ribs 18 and the raised areas 20, 24, the elements 12 are pressed together so that they touch only by means of being screwed together with a screw and a nut. As a result, manufacture-induced tolerances of the gratings 36, 40 can be eliminated.

The device 10 for fastening elements to a grating 36, 40 comprised of wires 34, 38 is a simple, inexpensive component made of plastic, which can easily be mounted to different gratings 36, 40.

Different modifications of the device 10 are conceivable. In lieu of the bore 30 and the pin 32, for example, continuous bores can also be provided, through which screws are guided that hold the two elements 12 together by means of nuts. It is also possible for the two elements 12 to be embodied differently. For example, a first modified element can have ribs and raised areas and a second modified element can be embodied merely as a plate with flat surfaces on both sides. In lieu of plastic, the device 10 can also be embodied, for example, as a diecast metal part and consequently can transmit higher forces. In addition to a square surface area, other surface areas are also conceivable which are respectively adapted to the different mesh forms of gratings. If higher forces are to be transmitted, modified devices can also be used which are comprised of more than two elements.

What is claimed is:

1. A device for fastening elements to at least one first grating composed of wires, the device comprising at least two essentially flat elements which are connectable to each other and clampable around the wires of the at least first grating, said elements having at least one side with side edges, ribs provided along said side edges and leaving corner regions of said side edges being open, said ribs having sides, said sides of said ribs and said at least one side of said elements being placeable at least partially against the wires of the at least first grating, wherein a square, first raised area is formed onto a center portion of said at least one side of at least one of said elements, said square, first raised area having a surface area that is smaller than a surface area of said at least one element, wherein a second raised area is formed onto said square, first raised area, said second raised area having a surface area that is smaller than the surface area of said first raised area, said second raised area having sides, said sides of said second raised area and said surface area of said first raised area being arranged to rest at least partially against wires of a second grating.

2. A device as defined in claim 1, wherein at least one of said elements has projections for encompassing the at least one first grating in a form-fitting manner.

3. A device as defined in claim 1, wherein said elements are identical.

4. A device as defined in claim 1, wherein one of said elements has at least one recess while the other of said elements has at least one projection formed so that said elements are connectable to each other by a press fit.

5. A device as defined in claim 1,wherein said elements are provided with a recess for fastening means.

6. A device as defined in claim 1, wherein said elements are composed of plastic.

7. A device as defined in claim 1, wherein said elements are composed of metal.

8. A device as defined in claim 1, wherein said elements are dimensioned so that they only touch each other when pressed together by fastening means.

* * * * *